US 8,495,221 B1

(12) United States Patent
Tsunoda et al.

(10) Patent No.: US 8,495,221 B1
(45) Date of Patent: Jul. 23, 2013

(54) TARGETED AND DYNAMIC CONTENT-OBJECT STORAGE BASED ON INTER-NETWORK PERFORMANCE METRICS

(71) Applicant: Limelight Networks, Inc., Tempe, AZ (US)

(72) Inventors: Koichi Tsunoda, Seattle, WA (US); Michael Asavareungchai, Sammamish, WA (US); Paul Cho, Emeryville, CA (US); Soam Acharya, San Bruno, CA (US); Jason Thibeault, Gilbert, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/654,197

(22) Filed: Oct. 17, 2012

(51) Int. Cl.
*G06F 15/173* (2006.01)
*G06F 13/00* (2006.01)

(52) U.S. Cl.
USPC ........... 709/226; 709/224; 709/225; 711/170; 711/171; 711/172; 711/173

(58) Field of Classification Search
USPC .......................... 709/224–226; 711/170–173
See application file for complete search history.

(56) References Cited

U.S. PATENT DOCUMENTS

| | | | |
|---|---|---|---|
| 5,991,809 A | | 11/1999 | Kriegsman |
| 6,578,077 B1 * | | 6/2003 | Rakoshitz et al. ............ 709/224 |
| 6,647,415 B1 * | | 11/2003 | Olarig et al. .................. 709/224 |
| 6,754,699 B2 * | | 6/2004 | Swildens et al. .............. 709/217 |
| 6,898,634 B2 * | | 5/2005 | Collins et al. ................. 709/226 |
| 6,898,670 B2 * | | 5/2005 | Nahum ......................... 711/114 |
| 6,915,234 B2 * | | 7/2005 | Curtin et al. .................. 702/182 |
| 7,099,936 B2 * | | 8/2006 | Chase et al. .................. 709/223 |
| 7,328,223 B2 * | | 2/2008 | Nakamichi et al. ................ 1/1 |
| 7,406,098 B2 * | | 7/2008 | Taneja et al. ................. 370/468 |

(Continued)

FOREIGN PATENT DOCUMENTS

CA 2475325 A1 8/2003

OTHER PUBLICATIONS

James Broberg et al., "MetaCDN: Harnessing 'Storage Clouds' for high performance content delivery", Retrieved on Nov. 3, 2012 from http://citeseerx.ist.psu.edu/viewdoc/download?doi=10.1.1.144.7766&rep=rep1&type=pdf, Journal of Network and Computer Applications, Sep. 2009, vol. 32, Issue 5, pp. 1012-1022.

(Continued)

*Primary Examiner* — Backhean Tiv
(74) *Attorney, Agent, or Firm* — Kilpatrick Townsend & Stockton LLP (57) ABSTRACT

Methods and systems for coordinating provisions of storage service for clients are provided. For each storage provider of a set of storage providers, a service-provider database stores a metric characterizing a property of a service provided by the service provider. The storage providers are independently owned and operated relative to each other. The metrics are repeatedly updated. A selection engine repeatedly selects a service provider from the set of service providers to store a content object of a client of the content delivery system. The selection is based on the repeatedly updated metrics for the set of service providers. For each service provider selected by the selection engine to store the content object of the client, a service manager coordinates with the service provider such that the service provider stores the content object of the client.

17 Claims, 6 Drawing Sheets

U.S. PATENT DOCUMENTS

| | | | |
|---|---|---|---|
| 7,562,078 B1* | 7/2009 | Yadav et al. | 1/1 |
| 7,685,109 B1* | 3/2010 | Ransil et al. | 707/999.003 |
| 8,041,616 B2* | 10/2011 | Cullen et al. | 705/35 |
| 8,073,922 B2* | 12/2011 | Bates | 709/208 |
| 8,082,412 B2* | 12/2011 | Bodmer et al. | 711/165 |
| 8,090,863 B2 | 1/2012 | Raciborski et al. | |
| 8,255,538 B1* | 8/2012 | Lam et al. | 709/226 |
| 8,291,108 B2* | 10/2012 | Raja et al. | 709/238 |
| 8,299,944 B2* | 10/2012 | Provenzano | 341/50 |
| 8,315,895 B1* | 11/2012 | Kilat et al. | 705/7.11 |
| 8,369,217 B2* | 2/2013 | Bostica et al. | 370/232 |
| 2002/0129216 A1* | 9/2002 | Collins | 711/170 |
| 2002/0143798 A1* | 10/2002 | Lisiecki et al. | 707/200 |
| 2003/0182449 A1 | 9/2003 | Anderson et al. | |
| 2003/0187970 A1* | 10/2003 | Chase et al. | 709/223 |
| 2004/0013089 A1* | 1/2004 | Taneja et al. | 370/235 |
| 2004/0073596 A1 | 4/2004 | Kloninger et al. | |
| 2004/0179515 A1* | 9/2004 | Kamani et al. | 370/352 |
| 2004/0268035 A1* | 12/2004 | Ueno | 711/112 |
| 2006/0149798 A1* | 7/2006 | Yamagami | 707/204 |
| 2007/0192130 A1* | 8/2007 | Sandhu | 705/1 |
| 2007/0294255 A1* | 12/2007 | Gross et al. | 707/10 |
| 2008/0052331 A1* | 2/2008 | Ogawa et al. | 707/205 |
| 2008/0063387 A1* | 3/2008 | Yahata et al. | 386/126 |
| 2008/0222025 A1* | 9/2008 | Fellenstein et al. | 705/37 |
| 2009/0150556 A1* | 6/2009 | Kim et al. | 709/231 |
| 2009/0161682 A1* | 6/2009 | Johnson et al. | 370/401 |
| 2009/0235115 A1* | 9/2009 | Butlin et al. | 714/8 |
| 2010/0057837 A1 | 3/2010 | Yoo et al. | |
| 2010/0077056 A1* | 3/2010 | Kokal et al. | 709/217 |
| 2010/0250710 A1* | 9/2010 | Cadwell et al. | 709/219 |
| 2010/0306379 A1* | 12/2010 | Ferris | 709/226 |
| 2011/0047286 A1* | 2/2011 | Harrang et al. | 709/233 |
| 2011/0078230 A1* | 3/2011 | Sepulveda | 709/203 |
| 2011/0208752 A1* | 8/2011 | Lidstrom et al. | 707/748 |
| 2011/0213712 A1* | 9/2011 | Hadar et al. | 705/80 |
| 2011/0252100 A1* | 10/2011 | Raciborski et al. | 709/206 |
| 2011/0307586 A1* | 12/2011 | Raciborski et al. | 709/219 |
| 2012/0047483 A1* | 2/2012 | Amit et al. | 717/104 |
| 2012/0060212 A1* | 3/2012 | Inoue | 726/14 |
| 2012/0215938 A1* | 8/2012 | Fletcher et al. | 709/238 |
| 2012/0222040 A1* | 8/2012 | Machida | 718/104 |
| 2012/0297033 A1* | 11/2012 | Raciborski et al. | 709/219 |
| 2013/0018978 A1* | 1/2013 | Crowe et al. | 709/214 |

OTHER PUBLICATIONS

"Cloud-Web-Hosting-Is-Basically-A-Complete-System", Retrieved on Nov. 3, 2012 from http://www.pdf-archive.com/2012/09/04/cloud-web-hosting-is-basically-a-complete-system-69-4/cloud-web-hosting-is-basically-a-complete-system-69-4.pdf.

Al-Mukaddim Khan Pathan et al., "A Taxonomy and Survey of Content Delivery Networks", Retrieved on Nov. 3, 2012 from http://www.cloudbus.org/reports/CDN-Taxonomy.pdf.

* cited by examiner

TARGETED AND DYNAMIC CONTENT-OBJECT STORAGE BASED ON INTER-NETWORK PERFORMANCE METRICS

BACKGROUND

This disclosure relates in general to dynamically moving clients' content objects across independent storage facilities based on facility-associated metrics and to collecting content objects required to generate an instance of a dynamic web page.

A web page can include one or more content objects. An entity owning or managing of the web page can be faced with a decision regarding how and where to store associated content objects such that they can be retrieved upon request. A variety of service providers offer storage options. However, the entity can become overwhelmed with the options and can have difficulty predicting service characteristics associated with each provider. A poor decision can have long-lasting consequences. First, the entity may have engaged in a contract with the provider, making it difficult to improve the decision by switching to another provider. Second, viewers who attempted to access the web page may have grown frustrated with the experience, such that the entity suffers with respect to traffic and/or profit.

SUMMARY

In one embodiment, the present disclosure provides a method and system for distributing and collecting content objects across independent storage facilities. Each client (e.g., web-page or content-object provider) identifies storage-service priorities. For example, the client can rank order or score factors such as scalability, reliability, throughput, latency, and cost. Each service provider in a set of service providers is assessed using a set of metrics. The metrics can be based on automatic performance-characterizing reports received from user devices that requested a web page at least partly provided by a respective content provider. Based on a client's priorities and service providers' metrics, a subset of the set of service providers is identified. The number of service providers in the subset and/or the identity of service providers in the subset can depend on the priorities and/or metrics (e.g., including more than one service providers that could collectively duplicate storage services when a client prioritizes reliability substantially more highly than cost). The metrics can be repeatedly and automatically updated or refined based on new data from the service providers and/or from components (e.g., user nodes) utilizing services provided by the service providers. Similarly, a subset of service providers (e.g., the number, identity and/or responsibilities of the providers) can also be repeatedly and automatically updated for a given client. Updating the subset to include a new service provider can involve transmitting one or more content objects to the new service provider (e.g., transmitting a copy of a local version of the objects) or requesting (e.g., from a client server) that the one or more content objects be transmitted to the new service provider. Further, a topology can be created or updated wherein a first identifier (e.g., associated with a client or content object) is mapped to a second identifier (e.g., each being associated with a service provider). The client may, or may not, be notified of the update.

When a user requests content objects associated with a client, a current subset of service providers associated with the requested objects can be identified. Requests for the content objects can be appropriately formatted based on the service providers. For example, the request can include values for fields required by the service providers. In some instances, a user node requests a web page (e.g., by entering a uniform resource identifier (URI)). A landing pad receives the request, identifies content objects associated with the web page, and identifies one or more service providers associated with each content object. For each service provider and content object, the landing pad determines another identifier for the content object (e.g., another URI) that will be recognized by the appropriate service provider. The landing pad requests the content objects from the identified service providers, including the other identifiers in the request. The service providers can then transmit the content objects directly to the requesting user node (e.g., in instances in which the user node is identified in the landing pad's request) or indirectly to the requesting user node via the landing pad. Thus, the landing pad can utilize a topology or map in which a first, stable identifier for a content object is associated with one or more second identifiers for the content object, and the one or more second identifiers can be updated as a subset of service providers associated with the content object (e.g., by virtue of association with a client) is updated. A client can therefore maintain stability in, e.g., a web page's uniform resource locator, even as content objects associated with the web page are shuffled amongst storage providers. These embodiments can be extended to instances in which a user node requests a content object from the landing page rather than a web page.

In some embodiments, a content delivery system for coordinating provisions of storage service for clients is provided. For each storage provider of a set of storage providers, a service-provider database stores a metric characterizing a property of a service provided by the service provider. The storage providers are independently owned and operated relative to each other. The metrics are repeatedly updated. A selection engine repeatedly selects a service provider from the set of service providers to store a content object of a client of the content delivery system. The selection is based on the repeatedly updated metrics for the set of service providers. For each service provider selected by the selection engine to store the content object of the client, a service manager coordinates with the service provider such that the service provider stores the content object of the client.

In some embodiments, a method for coordinating provisions of storage service for clients, the method comprising: For each storage provider of a set of storage providers, a metric characterizing a property of a service provided by the service provider is stored. The storage providers are independently owned and operated relative to each other. A first service provider from the set of service providers is selected to store a content object of a client. The selection is based on the metrics for the set of service providers. The first service provider is coordinated with such that the first service provider stores the content object of the client. A stored metric is updated. A second service provider is selected from the set of service providers to store the content object of the client. The selection is based on the updated metric. The second service provider is coordinated with such that the second service provider stores the content object of the client.

In some embodiments, a method for coordinating provisions of storage service for clients is provided. For each storage provider of a set of storage providers, a metric characterizing a property of a service provided by the service provider is stored. The storage providers are independently owned and operated relative to each other. The metrics are repeatedly updated. A service provider is selected from the set of service providers to store a content object of a client. The selection is based on the metrics for the set of service providers. The service provider is coordinated with such that the service provider stores the content object of the client. The metrics are periodically reanalyzed to determine whether another service provider from the set of service providers is to store the content object of the client. Upon determining that the another service provider from the set of service providers is to store the content object of the client, the another service provider is coordinated with such that the another service provider stores the content object.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
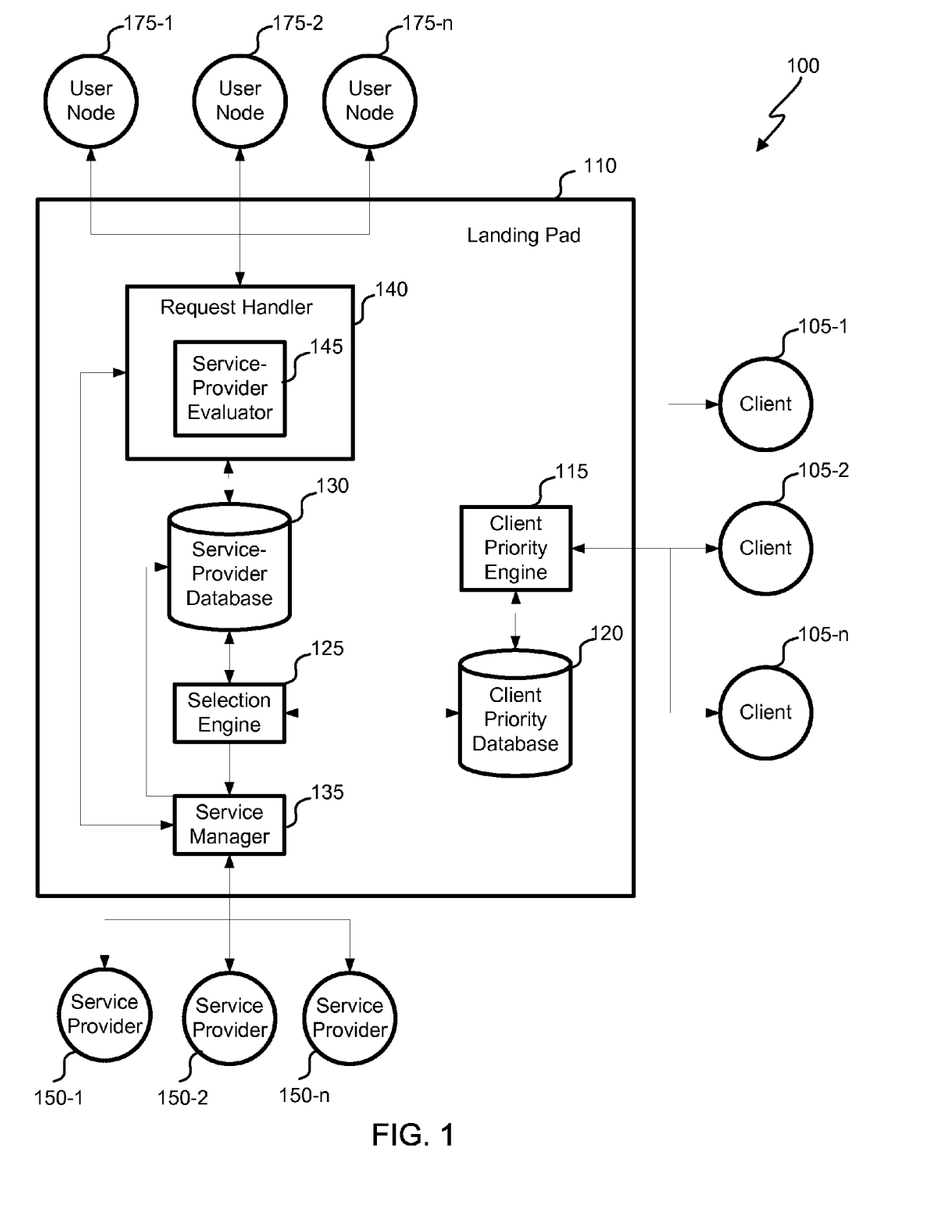
FIG. 1 depicts a block diagram of an embodiment of a content distribution system.

Referring first to FIG. 1, a block diagram of an embodiment of a content distribution system 100 is shown. Each client 105-1, 105-2, . . . 105-*n* interacts with a landing pad 110 that coordinates storage of content objects. Each client 105 identifies and/or provides content objects to be stored. In some instances, each client 105 provides and/or manages one or more web pages, each of which is associated with one or more content objects (e.g., a source-code file, an image file, a Java script, etc.).

A content object is any content file, content stream or a range defining a segment of a content file or content stream and could include, for example, video, pictures, data, audio, software, and/or text. The content object could be live, delayed or stored. Throughout the specification, references may be made to a content object, content, content stream and/or content file, but it is to be understood that those terms could be used interchangeably wherever they may appear.

Landing pad 110 identifies one or more service providers 150 to store clients' content objects. A storage provider can include a server, a group of servers, a content delivery network (e.g., having a plurality of geographically distributed points of presence (PoPs), in which multiple POPs can use a same IP address such that an Anycast routing scheme is used to find a POP likely to be close in a geographic or network sense to a user node 175 or landing pad 110) and/or a cloud computing network. It will be appreciated that a set of available service providers 150 can include different types of service providers. Some or all service providers 150 may further be capable of processing (e.g., transcoding, compressing, etc.) content objects. The service providers 150 can be independently owned and operated relative to each other and/or relative to content delivery network 100. In some instances, some service providers 150 are independently owned and operated relative to each other and/or relative to content delivery network 100 while others are not (e.g., one company owning and operating a content-delivery network and a cloud-computing network and another company operating another content-delivery network).

A client priority engine 115 of landing pad 110 interacts with each client to determine the client's service priorities. Client priority engine 115 identifies a number of service factors to each client. Example factors include potential to handle large request volumes within short time periods, estimated maximum storage-space requirements, availability, latency, users' quality of service or financial cost. A client then evaluates the factors, e.g., by rank-ordering the factors, assigning an importance score to each factor, selecting a subset of the factors important to the client or selecting a package associated with predefined factor scores. Evaluation of one factor may or may not restrict possible evaluation of another factor (e.g., if a client identifies nearly all factors as having a maximum importance score, it may not be possible for the client to identify inexpense as also having a maximum importance score). In some instances, each factor is independent (e.g., in instances in which cost is not a factor for evaluation). The evaluation can be specific to a single content object, specific to a set of content objects (e.g., all content objects that can be rendered on a web page or web site) or general across all content objects associated with the client.

Client priority engine 115 then stores the priorities (e.g., the evaluations or a processed version thereof, such as a cross-factor normalized version) in a client priority database 120. The database can associate a client and/or one or more content objects with the priorities. Based on the priorities, a selection engine 125 identifies a subset of a set of service providers 150 to store one, some or all of the client's content objects. For example, if a client 105 provides different evaluations for different content-object groups, a different subset of service providers 150 can be identified for each group. Identification of the subset can involve identifying a number of service providers in the subset and/or identities and responsibilities of the service providers in the subset. For example, if a client very highly prioritizes availability, selection engine 125 may determine that the client's content objects should be stored on each of two or more service providers. Then, if one service provider is irresponsive, another can serve as a backup.

In order to determine the subset of service providers, selection engine 125 assesses one or more metrics associated with each service provider 150 in the set. The metrics can include numeric scores (e.g., within a defined range), numeric rankings (e.g., relative to rankings of other service providers), categories (e.g., "Good" or "High"), statistical values (e.g., a mean, median, mode, minimum, maximum, range, percent above/below a threshold, or distribution), etc.

Each metric can characterize a performance or characteristic of the service provider related to a specific metric category. Example metric categories include scalability (indicative of whether service-provider characteristics such as processing power and bandwidth are sufficient to handle a large number of content-object requests within a short time period), storage capacity (indicative of a total or per-client storage space that can be provided by a storage provider), availability (indicative of how reliably content objects stored by a storage provider can be accessed), latency (indicative of a delay associated with retrieving a content object from storage provided by the storage provider), throughput (indicative of an average or minimum bandwidth provided by a service provider) or financial cost. It will be appreciated that some metric categories can be the same as some client-evaluation factors. In some instances, a client-evaluation factor is not the same as a metric category but nonetheless relates to one or more metric categories. For example, if a client wishes to guarantee high quality of service to users, it may be desirable to seek out service providers with high (or at least above-threshold) minimum throughput metrics.

A service-provider database 130 stores data associating each storage provider 150 with one or more metrics. In some instances, each service provider 150 is associated with a single metric or set of metrics. In some instances, one or more service providers 150 are associated with multiple metrics or multiple sets of metrics. For example, a service provider 150 may offer multiple types of service, and each type can be associated with its own set of metrics. The metrics can be determined based on data from the service providers 150 (which communicate with the service-provider database via a service manager 135) and/or from user nodes 175 (which communicate with the service-provider database via a request handler 140).

For example, a service provider 150 can identify a cost of one or more types of service, a predicted maximum per-client storage space, a predicted latency, and a predicted average or minimum bandwidth. Data from user nodes 175 can identify empirical data internal within content distribution system 100. For example, user nodes 175 can identify an actual latency, bandwidth or response success/error characterization. A service-provider evaluator 145 can aggregate this data received from a set of user nodes. For example, service-provider evaluator 145 can determine a mean or distribution of values over a time period or can extrapolate values to predict a future value. Service-provider database may thus store individual data points from user nodes 175 such that they can be re-aggregated as new data is received and/or as time passes.

Using the metrics, selection engine 125 identifies one or more service providers 150 to store one, more or all content objects for a given client 105. The client's (content-object-specific or general) priorities can be used to weight the metrics and determine an overall score (e.g., by summing the weighted metrics) for each service provider (and/or each available type of service). Thus, each priority can be mapped to one or more metric.

In one instance, selection engine 125 first determines a score for each client-evaluation factor for each service provider based on a relationship between the factor and service-provider metrics. The score can be calculated by weighting each metric with a relationship weight (pertaining to a specific factor), summing the weighted metrics and normalizing the value based on a sum of the weights. For example, the table below illustrates how various metrics can be related to a quality-of-service factor. For that factor, a factor score for the example service provider can be calculated to be a sum of the weighted scores divided by a sum of the weights (e.g., 5.7/1.2=4.75).

|  | Scalability | Storage capacity | Availability | Latency | Minimum bandwidth | Cost |
|---|---|---|---|---|---|---|
| Relationship weight for QoS factor | 0.1 | 0 | 0.1 | 0.3 | 0.7 | 0 |
| Scores of example service provider | 5 | 7 | 4 | 9 | 3 | 2 |
| Weighted scores | 0.5 | 0 | 0.4 | 2.7 | 2.1 | 0 |

The factors can then be weighted based on priority weights identified from the client's factor evaluations. For example, each factor score can be weighted by a priority weight, the weighted factors can be summed and the sum can be divided by a sum of the weights. Thus, for each client (or content object or group of content objects), a single overall score can be identified for each service provider (or type of service). The overall score and the factor scores can be stored in service-provider database 130. Advantageously, only the overall score is specific to a client or content object.

Selection engine 125 can determine a number of service providers n to provide service to a client. The number can be fixed (e.g., n=1), can depend on a client's factor evaluations (e.g., n=2 if a client scores an availability factor with an above-threshold score), and/or can depend on the scores (e.g., n=2 if no service providers have an availability factor score above a threshold). In instances in which multiple service providers are to provide service, the provided service may be the same across the providers. In these instances, even if one service provider experiences technical difficulties, another can ensure reliable overall service. Further, multicast requests to the service providers can enable a client to benefit from whichever service provider is quickest to respond to the request in a given instance. In some instances, the provided services differ across the providers. For example, a first service provider may be chosen to store large content objects (e.g., video files) and one or more other service providers may be chosen to store other content objects.

Selection engine 125 simultaneously or subsequently identifies one or more service providers to store content objects for a client based on the calculated scores (e.g., calculated overall scores or specific factor scores). The service providers can include, e.g., n service providers with a highest score. In some instances, a group of service providers with a score above a threshold are first identified and n service providers are subsequently selected from the group. The selection can be performed pseudo-randomly or based on considerations such as service continuity (e.g., preferring service providers that previously served the client), user-node review count (e.g., preferring service providers with many user-node reviews), service options (e.g., preferring service providers with many service options), etc. In some instances, the identification also depends on capabilities of service providers 150 to perform client-desired processing (e.g., transcoding). For example, it may be required that service providers be capable of performing one or more types of processing, or service-provider selection can depend on metrics assessing how well and/or quickly service providers 150 can perform the one or more types of processing.

In some instances, a client 105 is informed as to which service providers 150 have been selected for service. The client 105 can also be informed of an estimated price of using the identified service provider(s). The client 105 can thereafter be prompted to respond to the information. For example, after a client 105 submits its evaluation of factors, a sample subset of service providers 150 can be identified and presented to the client 105. The client can either then confirm the factor evaluations or reject them (e.g., by re-adjusting the evaluations). The sample subset of service providers 150 may represent a first subset of service providers 150 that will serve the client 105. In some instances, the sample subset is just an example, and the client may never be served by the precise subset (e.g., as the selection engine 125 may re-identify the service providers 150 upon a contract start date with the client 105 or upon finalization of input from the client 105).

After an initial identification of the subset of content providers, the subset may thereafter be adjusted (e.g., re-determined). The adjustment can be performed as described above (e.g., by considering a client's priorities and service providers' metrics). The client may or may not be aware of the adjustment. For example, a client may or may not be informed of a sample subset of service providers. The subset can thereafter be adjusted without informing the client. Thus, landing pad 110 can act as a black box to the client, in which the client need not track which entities are providing service, but instead can focus on functional priorities of their content handling.

When selection engine 125 identifies a subset of service providers (e.g., as an initial identification or an adjustment), selection engine 125 then updates service-provider database 130 to indicate which service providers 150 have been selected to serve a particular client 105. In some instances, this information is stored in another database. Selection engine 125 also transmits the identifications to service manager 135. Service manager 135 coordinates with the identified service provider(s) 150 to ensure that the desired service is provided. This coordination can involve, e.g., executing a short-term or long-term contract, transmitting electronic payment to a service provider 150, collecting electronic payment from a client 105 or recording an amount due by the client 105, identifying the client 105 to the service provider 150, identifying one or more content objects to be stored to the service provider 150, transmitting one or more content objects to the service provider 150 and/or receiving data indicating how and/or where the content objects will be store (e.g., identifying a second portion of a uniform resource identifier (URI) to replace a first portion of a URI that will be included in user requests) and/or receiving data indicating requirements for requests (e.g., request fields required by the service provider). The coordination can also involve coordinating with a service that previously provided service but is no longer identified as being a service provider. This coordination can involve, e.g., terminating a contract, requesting that the service provider delete the content object and/or identifying a reason for a termination (e.g., a scalability factor score fell below a threshold).

Selection engine 125 can reassess (e.g., re-identify or adjust) content-provider identifications at regular intervals (e.g., fixed across clients or identified by a client), upon termination of one or more contracts with existing service providers 150, upon detecting that metrics or scores of service providers 150 serving a client have fallen below an absolute or relative threshold (e.g., a service provider 150 dropping from having the highest overall score for a client to having the third highest—which may occur based on recent user-node evaluations, changes in service providers' available services, or the addition or elimination of service providers 150 to content distribution system 100), and/or upon detecting that a client's factor evaluations have changed. In some instances, selection engine 125 frequently or continuously updates service providers' (e.g., client-specific) scores and determines whether a subset of providers should be adjusted based on the most recent scores. Again, clients 105 may or may not be notified when new service providers 150 are identified to serve the client. In some instances, clients 105 may access this information by pulling the information (e.g., logging onto a web page showing current service providers).

A same or different landing pad 110 can coordinate handling of user requests for content. A user node 175 can request one or more content objects (e.g., a web page file, an image, etc.). The request can include a URI, such as a uniform resource locator.

The request can be transmitted to a request handler 140. Request handler 140 can access service-provider database 130 to determine which service providers 150 are associated with the requested content. For example, request handler 140 can determine one or more service providers that serve a client (thereby storing all content objects associated with the client) or can determine one or more service providers that are storing a content object or group of content objects. Thus, in some instances, request handler 140 identifies a client or group associated with a requested content object (e.g., by parsing a URI from the request and looking up a client or content-object group using the parsed URI).

Service manager 135 then generates a request for the requested content. The request can include a new content identifier that may differ from a content identifier in the user-node request. For example, a user-node request can include a URI: http://www.client1domain.com/image1.jpg, and the generated request can include a URI: http://www.serviceproviderdomain.com/client1index/image1.jpg. The new content identifier can be determined based on a topology, map or transformation rule in service-provider database. The topology, map or rule may be specific to a content object, to a group of content objects of a client or may identify a more general mapping. The generated request can also include fields or formatting as required by the service provider and/or may include an identification or characteristics off a requesting user node 175.

Service manager 135 transmits the request to the identified service provider(s) 150. If the identified service provider 150 is a content delivery network, the request can be routed (by the CDN or landing pad 110) to a PoP near landing pad 110 or near a requesting user node 175, or an Anycast request can be used to communicate with multiple PoPs.

In some instances, a single or multiple requests can be simultaneously transmitted to multiple service providers 150. For example, requests for a same content object can be sent to multiple providers to benefit from the fast response. The request can instruct a service provider to provide a content object directly to a user node 175 (e.g., and also notify service manager 135 of such provision) or to provide the content object to service manager 135 to forward to the user node 175.

Service manager 135 receives responses from the service providers 150. In some instances, if a response are unsatisfactory (e.g., if a service provider 150 is improperly operating, is irresponsive or is slow at responding), service manager 135 generates and transmits one or more new requests (e.g., to other content providers). When the content object is provided in the response, service manager 135 transmits the content object to the requesting user node via request handler 140. In some instances, request handler 140 further processes the content object before it is transmitted to the user node (e.g., to transcode the object into a format readable at the user node, to compress the object, etc.).

A user node 175 that requested content can automatically notify request handler 140 (e.g., service-provider evaluator 145 of request handler 140) about its subsequent experience. The notification can include, e.g., whether the content was received, a delay between a request for and receipt of the content, and/or a quality of service (e.g., whether a streaming video required frequent buffering). The notification can further include characteristics of the user node 175 or content object, such that landing pad 110 can subsequently determine under what conditions service provided by a service provider provides poor, acceptable or good service.

Service-provider evaluator 145 updates metrics service-provider database 130 based on the notification. The updating may occur at regular intervals or every time a number (e.g., 1, 10, 100, 1000) of user-node notifications are received. Thus, subsequent service-provider identifications can be sensitive to actual user-node experiences associated with various service providers.

Figure 2:
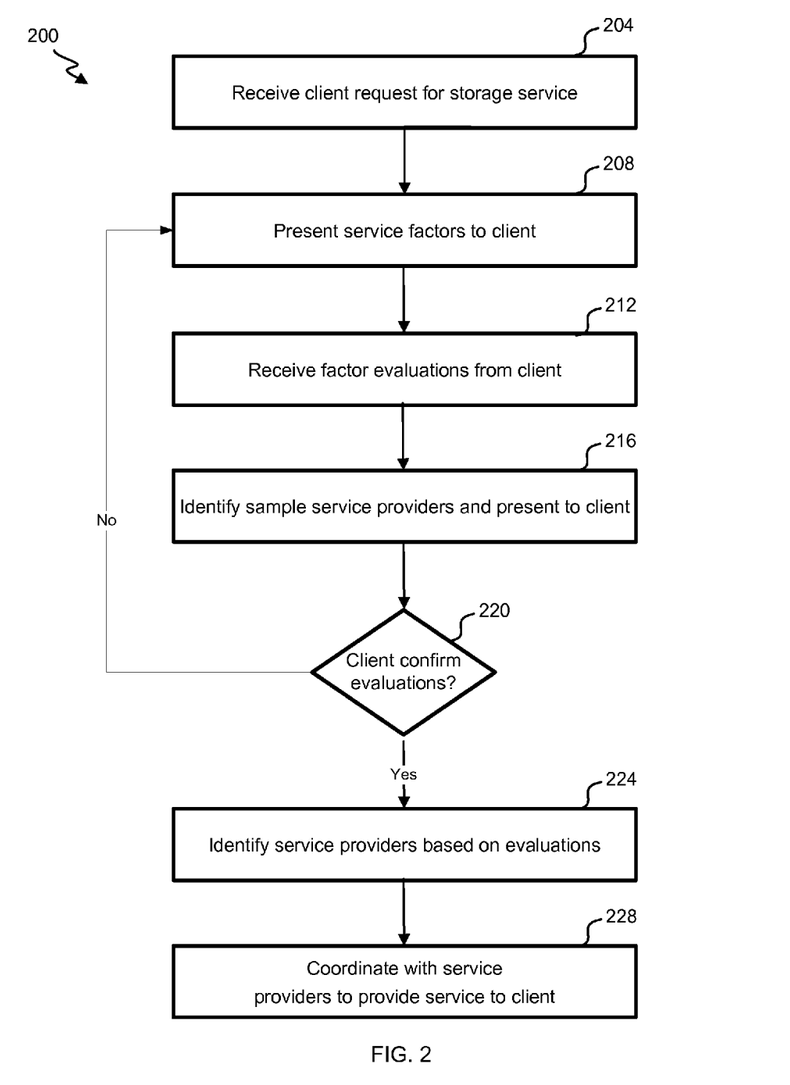
FIG. 2 illustrates a flowchart of an embodiment of a process for coordinating an initial provision of a storage service to a client.

With reference to FIG. 2, a flowchart of an embodiment of a process 200 for coordinating an initial provision of a storage service to a client 105 is shown. The depicted portion of the process 200 begins in block 204 where landing pad 110 receives a request from client 150 for storage service. The request can be received, e.g., over a web page. The request can request that one or more identified content objects be stored or that all content objects associated with the client, a web site or a web page be stored (e.g., including those later associated with the client, web site or web page). In some instances, the request further identifies processing that the client 150 wishes a service to provide (e.g., unconditionally) or to be capable of providing (e.g., conditionally, such as following receipt of a user request for which transcoding of the object is appropriate).

Client priority engine 115 presents service factors to client 150 at block 208. Examples of factors are described elsewhere herein. The factors can be provided over a web page. Each factor can be presented near a client-interaction element. For example, the client-interaction element can include a slidable marker (one extreme end of the sliding region being associated with a high-importance valuation), a numeric box (for a client to input a numeric indication of an importance evaluation), radio buttons or a drop-down menu (from which a client can select an importance evaluation), etc.

Client priority engine 115 receives evaluations of the factors from client 105 at block 212. The evaluations can include numeric evaluations or can be convertible into numeric evaluations (e.g., associating each position of a sliding region with a number). Using the factor evaluations, selection engine 125 identifies one or more sample service providers from a set of available service providers 150, and presents identifications of the one or more sample service providers to client 105 (e.g., over a web page) at block 216. The one or more sample service providers can include an example or one service provider that could provide or a group of service providers that could collectively provide service meeting the clients' priorities, or it can include several examples of service providers any of which could provide or groups of service providers any of which could collectively provide service meeting the clients' priorities. An estimated or actual cost associated with using services provided by the service providers can also be presented.

At this point, client 150 can have an opportunity to confirm or reject its factor evaluations. In one instance, a client's subsequent adjustments to evaluations using client-interaction elements are indicative of a rejection. An example of a confirmation would be selecting a "confirm" button, submitting payment or electronically executing an agreement. In one instance, an approval of the sample service providers is indicative of a confirmation of the factor evaluations, and a rejection of the sample service providers is indicative of a rejection of the factor evaluations.

Client priority engine 115 determines whether client confirmed the factor evaluations at decision block 220. If it is determined that such confirmation has not been provided, process 200 returns to block 208. Otherwise, process 200 continues to block 224, at which selection engine 125 identifies service providers 150 to serve client 150 based on the factor evaluations. The identified service providers 150 can be the same as the sample service providers, can be a subset of the sample service providers or can differ from the sample service providers (e.g., in instances in which service-provider metrics changed between the identification of the sample service providers and the identification of the service providers at block 224).

Service manager 135 coordinates with the identified service providers 150 to provide service to client 105 at block 228. For example, contracts can be executed, content objects can be transmitted to service providers 150 and/or a mapping or topology between client-associated content-object identifiers (e.g., URIs) and service-provider content-object identifiers (e.g., other URIs) can be established.

Figure 3:
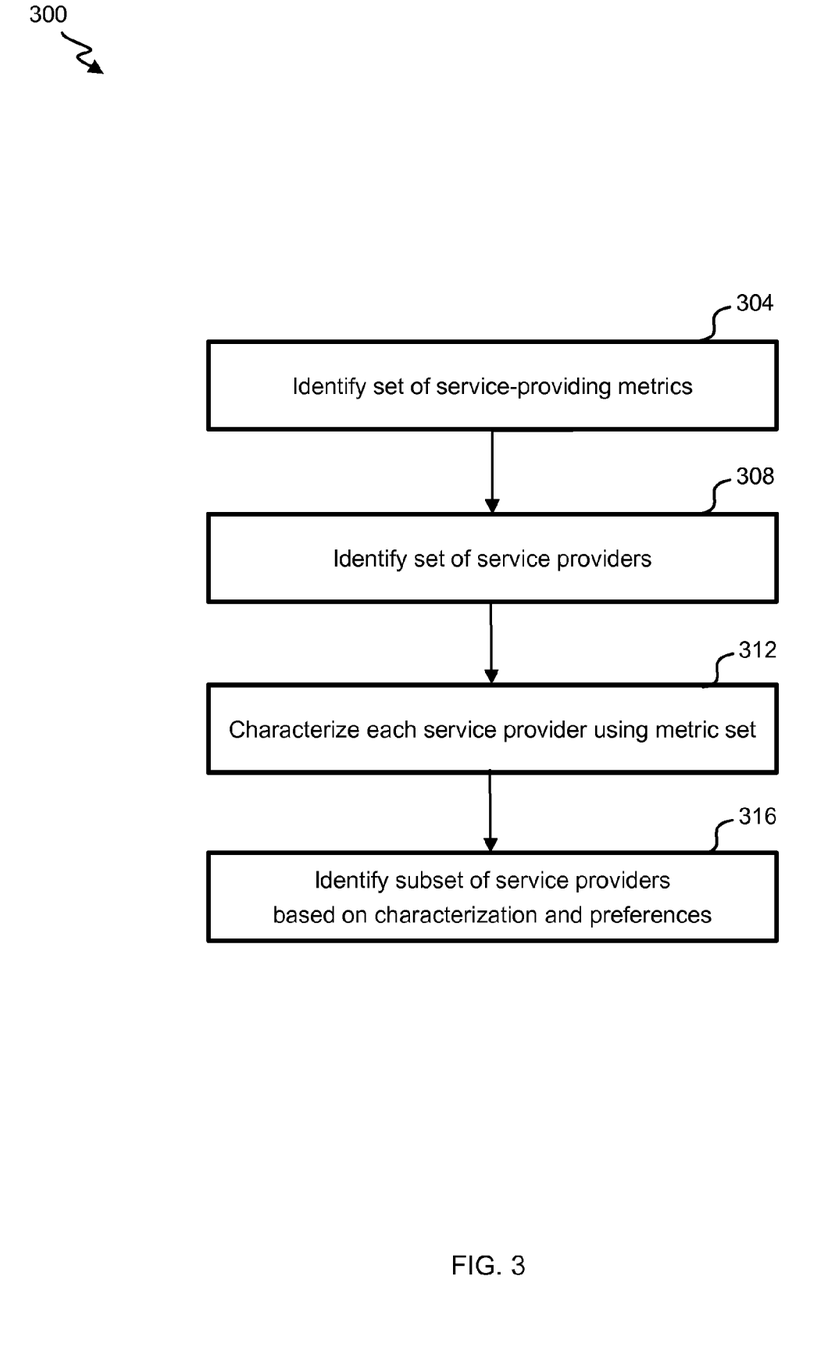
FIG. 3 illustrates a flowchart of an embodiment of a process for identifying a subset of content provider.

With reference to FIG. 3, a flowchart of an embodiment of a process 300 for identifying a subset of content providers is shown. The depicted portion of the process 300 begins in block 304 where selection engine 125 identifies set of service-providing metrics at block 304. The metrics can include ones that are relatively easy to track, quantify and compare across providers. Further, the metrics can relate to a quality experienced by user nodes requesting content and/or to factors important to a client (e.g., cost or scalability). The metrics can relate to factors evaluated by clients. Specific examples of metrics are described elsewhere herein.

At block 308, service manager 135 identifies set of service providers 150. The service providers 150 can include a group of public common service providers, service providers 150 requesting to interact with content distribution system 100, service providers 150 having provided service to the public for at least a threshold period of time, etc. As described herein, the set of service providers 150 can include different types of service providers (e.g., a content delivery networks and cloud-computing networks)

Service-provider evaluator 145 and/or service manager 135 characterize each service provider using the set of service-providing metrics at block 312. For example, for each metric, a number (e.g., a score, a time, a percentage, etc.) can indicate how well a service provider is performing with respect to the metric. The characterization can include performing statistics on data obtained from user nodes 175 and/or service providers 150. For example, the data associated with a time period can be aggregated; an extrapolation can be performed; and/or a mean, median, mode, extreme or percentage (e.g., above a threshold or associated with a successful result) can be calculated.

At block 316, selection engine 125 identifies a subset of service providers based on the characterization and client factor evaluations. Selection engine 125 can, e.g., identify a service provide with a top characterization for a metric associated with a factor most important to a client. In some instances, for each factor, selection engine 125 weights metrics, such that a factor score can be determined for each content provider 150. Factor scores for factors important to a client can then be compared across content providers. In one instance, for a client, factor scores are weighted based on the client's evaluations, and an overall score is determined based on a sum of the factor scores. The overall scores can then be compared across content providers.

Figure 4:
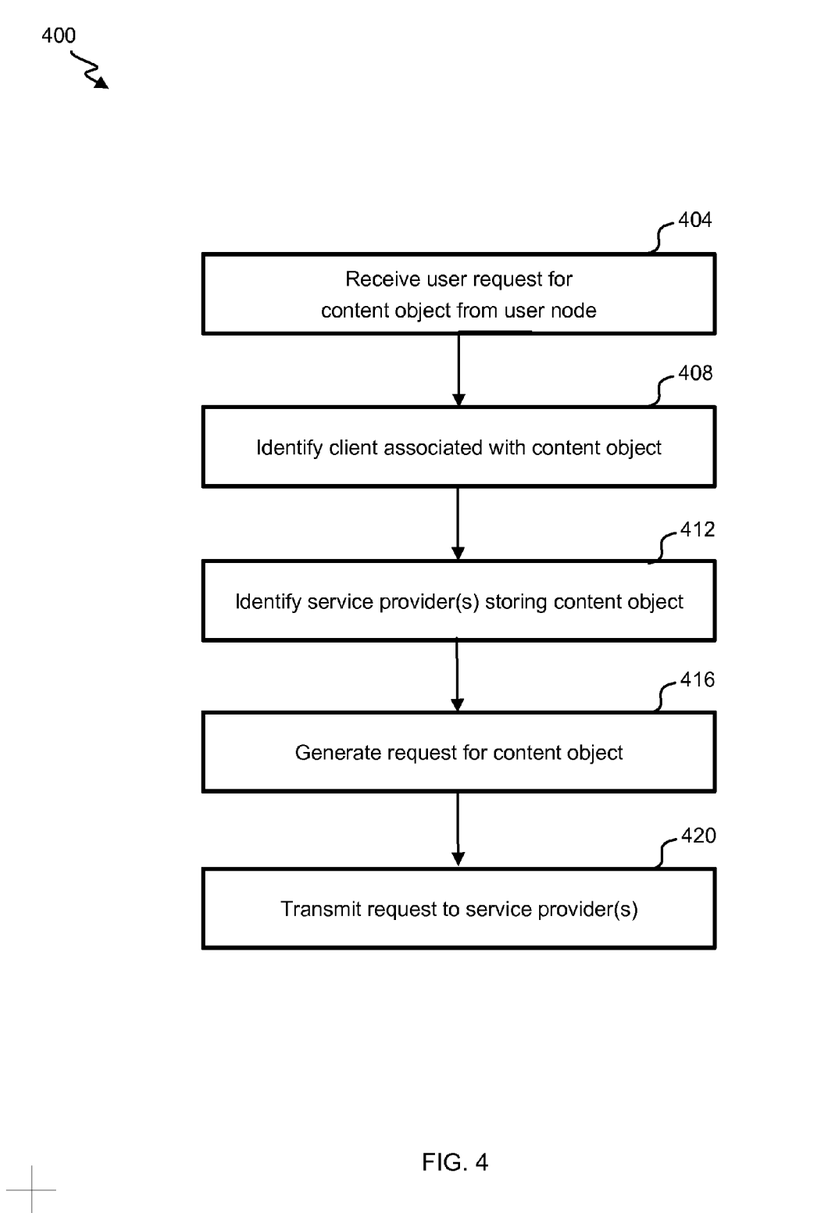
FIG. 4 illustrates a flowchart of an embodiment of a process for responding to user requests for content.

With reference to FIG. 4, a flowchart of an embodiment of a process 400 for responding to user requests for content is shown. The depicted portion of the process 400 begins in block 404 where request handler 140 receives a request for a content object from user node 175. The request can include an initial identifier for the content object, such as a URI. The request can further include an identifier and/or characteristics of user node 175 (e.g., an operating system, available software, a device types, etc.).

Request handler 140 identifies client associated with content object at block 408. For example, request handler 140 can parse the initial identifier and can identify a client based on a portion of the identifier (e.g., a domain name). The identification can involve consulting a database or map.

Request handler 140 identifies one or more service providers storing the requested content object at block 412, e.g., by consulting service-provider database 130. The one or more service providers can include those previously selected by selection engine 125 to store the object.

Service manager 135 then generates a new request for the content object at block 416. The new request can include formatting and/or fields requested or desired by the one or more service providers. The new request can also include a new identifier for the content object. The new identifier can be determined using a map or topology that indicates how initial identifiers for a given client (or for all clients) are to be translated into new identifiers. The new identifier can include, e.g., a different domain name and/or different segments as compared to the initial identifier. The new request can further identify a destination for the content object, which can be an identification of a user node or an identification of landing pad 110.

Service manager 135 transmits the generated request to the one or more service providers at block 420. The one or more service providers can subsequently transmit the requested content object to an identified destination, such as a requesting user node 175 or landing pad 110. It will be appreciated that the one or more service providers may further perform processing of the content object prior to its transmission, and/or (in instances in which the content object is transmitted to landing pad 110) landing pad 110 can perform processing of the content object.

Figure 5:
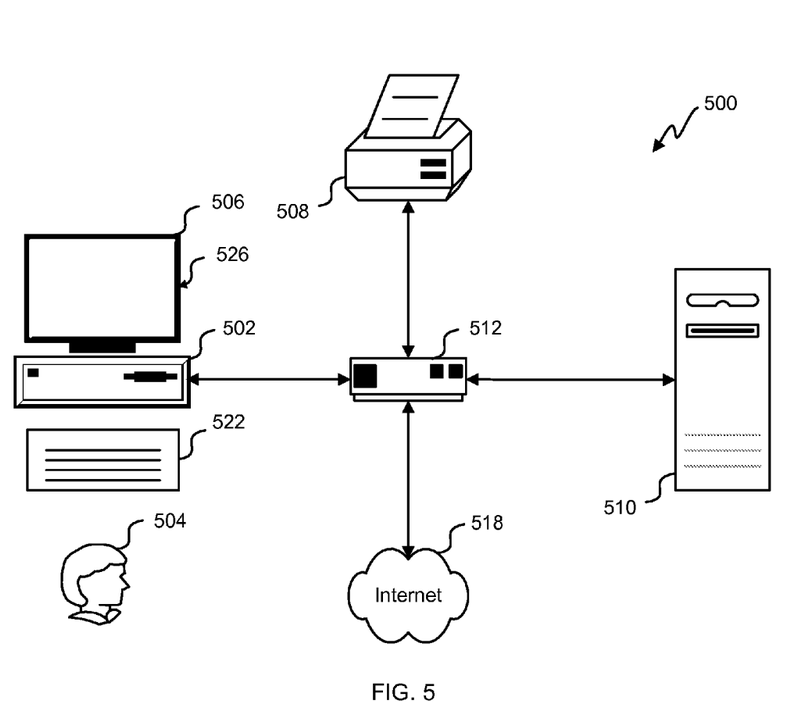
FIG. 5 depicts a block diagram of an embodiment of a computer system.

Referring next to FIG. 5, an exemplary environment with which embodiments may be implemented is shown with a computer system 500 that can be used by a designer 504 to design, for example, electronic designs. The computer system 500 can include a computer 502, keyboard 522, a network router 512, a printer 508, and a monitor 506. The monitor 506, processor 502 and keyboard 522 are part of a computer system 526, which can be a laptop computer, desktop computer, handheld computer, mainframe computer, etc. Monitor 506 can be a CRT, flat screen, etc.

A designer 504 can input commands into computer 502 using various input devices, such as a mouse, keyboard 522, track ball, touch screen, etc. If the computer system 500 comprises a mainframe, a designer 504 can access computer 502 using, for example, a terminal or terminal interface. Additionally, computer system 526 may be connected to a printer 508 and a server 510 using a network router 512, which may connect to the Internet 518 or a WAN.

Server 510 may, for example, be used to store additional software programs and data. In one embodiment, software implementing the systems and methods described herein can be stored on a storage medium in server 510. Thus, the software can be run from the storage medium in server 510. In another embodiment, software implementing the systems and methods described herein can be stored on a storage medium in computer 502. Thus, the software can be run from the storage medium in computer system 526. Therefore, in this embodiment, the software can be used whether or not computer 502 is connected to network router 512. Printer 508 may be connected directly to computer 502, in which case, computer system 526 can print whether or not it is connected to network router 512.

Figure 6:
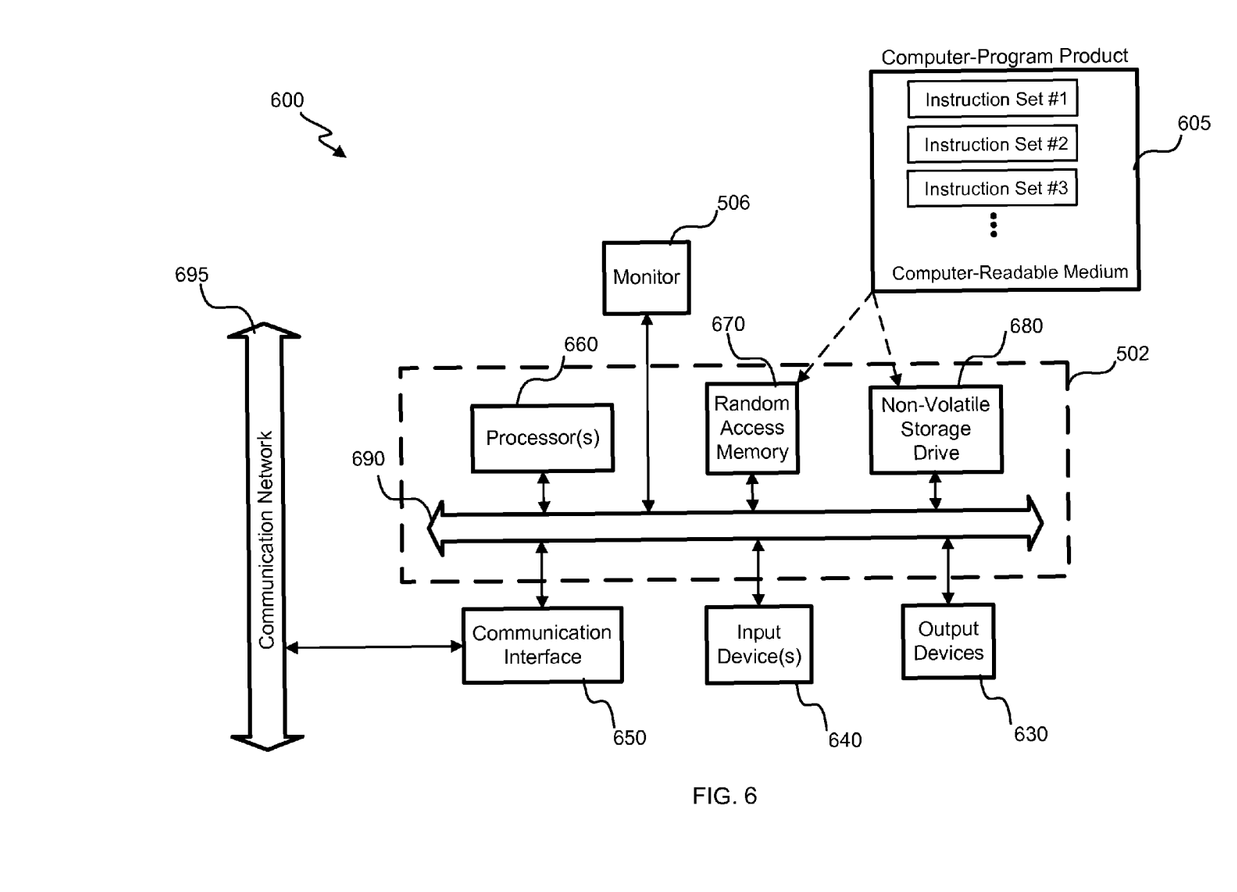
FIG. 6 depicts a block diagram of an embodiment of a special-purpose computer system.

With reference to FIG. 6, an embodiment of a special-purpose computer system 600 is shown. Landing pad 110 (or components of landing pad 110, such as client priority engine 115, selection engine 125, service manager or request handler 140) is an example of a special-purpose computer system 600. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 526, it is transformed into the special-purpose computer system 600.

Special-purpose computer system 600 comprises a computer 502, a monitor 506 coupled to computer 502, one or more additional user output devices 630 (optional) coupled to computer 502, one or more user input devices 640 (e.g., keyboard, mouse, track ball, touch screen) coupled to computer 502, an optional communications interface 650 coupled to computer 502, a computer-program product 605 stored in a tangible computer-readable memory in computer 502. Computer-program product 605 directs system 600 to perform the above-described methods. Computer 502 may include one or more processors 660 that communicate with a number of peripheral devices via a bus subsystem 690. These peripheral devices may include user output device(s) 630, user input device(s) 640, communications interface 650, and a storage subsystem, such as random access memory (RAM) 670 and non-volatile storage drive 680 (e.g., disk drive, optical drive, solid state drive), which are forms of tangible computer-readable memory.

Computer-program product 605 may be stored in non-volatile storage drive 690 or another computer-readable medium accessible to computer 502 and loaded into memory 670. Each processor 660 may comprise a microprocessor, such as a microprocessor from Intel® or Advanced Micro Devices, Inc.®, or the like. To support computer-program product 605, the computer 502 runs an operating system that handles the communications of product 605 with the above-noted components, as well as the communications between the above-noted components in support of the computer-program product 605. Exemplary operating systems include Windows® or the like from Microsoft Corporation, Solaris® from Sun Microsystems, LINUX, UNIX, and the like.

User input devices 640 include all possible types of devices and mechanisms to input information to computer system 502. These may include a keyboard, a keypad, a mouse, a scanner, a digital drawing pad, a touch screen incorporated into the display, audio input devices such as voice recognition systems, microphones, and other types of input devices. In various embodiments, user input devices 640 are typically embodied as a computer mouse, a trackball, a track pad, a joystick, wireless remote, a drawing tablet, a voice command system. User input devices 640 typically allow a user to select objects, icons, text and the like that appear on the monitor 506 via a command such as a click of a button or the like. User output devices 630 include all possible types of devices and mechanisms to output information from computer 502. These may include a display (e.g., monitor 506), printers, non-visual displays such as audio output devices, etc.

Communications interface 650 provides an interface to other communication networks and devices and may serve as an interface to receive data from and transmit data to other systems, WANs and/or the Internet 518. Embodiments of communications interface 650 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 650 may be coupled to a computer network, to a FireWire® bus, or the like. In other embodiments, communications interface 650 may be physically integrated on the motherboard of computer 502, and/or may be a software program, or the like.

RAM 670 and non-volatile storage drive 680 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 670 and non-volatile storage drive 680 may be configured to store the basic programming and data constructs that provide the functionality of various embodiments of the present invention, as described above.

Software instruction sets that provide the functionality of the present invention may be stored in RAM 670 and non-volatile storage drive 680. These instruction sets or code may be executed by processor(s) 660. RAM 670 and non-volatile storage drive 680 may also provide a repository to store data and data structures used in accordance with the present invention. RAM 670 and non-volatile storage drive 680 may include a number of memories including a main random access memory (RAM) to store of instructions and data during program execution and a read-only memory (ROM) in which fixed instructions are stored. RAM 670 and non-volatile storage drive 680 may include a file storage subsystem providing persistent (non-volatile) storage of program and/or data files. RAM 670 and non-volatile storage drive 680 may also include removable storage systems, such as removable flash memory.

Bus subsystem 690 provides a mechanism to allow the various components and subsystems of computer 502 communicate with each other as intended. Although bus subsystem 690 is shown schematically as a single bus, alternative embodiments of the bus subsystem may utilize multiple busses or communication paths within computer 502.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction (s) and/or data.

While the principles of the disclosure have been described above in connection with specific apparatuses and methods, it is to be clearly understood that this description is made only by way of example and not as limitation on the scope of the disclosure.

The invention claimed is:

1. A content delivery system for coordinating provisions of storage service for clients, the system comprising:
    a service-provider database running on a server that stores, for each independently owned and operated storage provider of a set of independently owned and operated storage providers, a metric characterizing a property of a service provided by the independently owned and operated storage provider, wherein the metrics are updated in response to a change in the metrics;
    a selection engine that repeatedly selects an independently owned and operated storage provider from the set of independently owned and operated storage providers to store a content object of a client of the content delivery system and generates a score for each independently owned and operated storage provider of the set of independently owned and operated storage providers, the score depending on a set of metrics associated with the independently owned and operated storage provider, the selection being based on the repeatedly updated metrics and the generated scores for the set of independently owned and operated storage providers; and
    a service manager that, for each independently owned and operated storage provider selected by the selection engine to store the content object of the client, coordinates with the independently owned and operated storage provider such that the independently owned and operated storage provider stores the content object of the client.

2. The content delivery system for coordinating provisions of storage service for clients as recited in claim 1, wherein the service manager coordinates with the independently owned and operated storage provider without having received, from the client and prior to the coordination, an authorization specific to the independently owned and operated storage provider to have the content object stored by the independently owned and operated storage provider.

3. The content delivery system for coordinating provisions of storage service for clients as recited in claim 1, further comprising a request handler that receives automatic feedback from a user node and updates at least one metric based on the feedback, wherein the user node previously requested a same or different content object, and wherein the request was routed to a same or different independently owned and operated storage provider of the set of independently owned and operated storage providers.

4. The content delivery system for coordinating provisions of storage service for clients as recited in claim 1, further comprising a client priority engine that presents a set of service factors to the client and that receives evaluations of the service factors from the client, wherein the selection of the independently owned and operated storage provider is further based on the evaluations of the service factors.

5. The content delivery system for coordinating provisions of storage service for clients as recited in claim 1, wherein the generated score further depends on preferences of the client.

6. The content delivery system for coordinating provisions of storage service for clients as recited in claim 1, further comprising a request handler that receives a first request from a user node for the content object, wherein the service manager: determines that the independently owned and operated storage provider is storing the content object; generates a second request for the content object; and transmits the second request to the independently owned and operated storage provider.

7. The content delivery system for coordinating provisions of storage service for clients as recited in claim 6, wherein the first request includes a first identifier of the content object and the second request includes a second identifier of the content object.

8. The content delivery system for coordinating provisions of storage service for clients as recited in claim 7, wherein each of the first identifier and the second identifier are uniform resource identifiers.

9. A method for coordinating provisions of storage service for clients, the method comprising:
    storing, for each independently owned and operated storage provider of a set of independently owned and operated storage providers, a metric characterizing a property of a service provided by the independently owned and operated storage provider;
    selecting a first independently owned and operated storage provider from the set of independently owned and operated storage providers to store a content object of a client;
    generating a score for each independently owned and operated storage provider of the set of independently owned and operated storage providers, the score depending on a set of metrics associated with the independently owned and operated storage provider, the selection being based on the metrics and the generated scores for the set of independently owned and operated storage providers;
    coordinating with the first independently owned and operated storage provider such that the first independently owned and operated storage provider stores the content object of the client;
    updating a stored metric in response to a change in the metric;
    selecting a second independently owned and operated storage provider from the set of independently owned and operated storage providers to store the content object of the client, the selection being based on the updated metric; and
    coordinating with the second independently owned and operated storage provider such that the second independently owned and operated storage provider stores the content object of the client.

10. The method for coordinating provisions of storage service for clients as recited in claim 9, wherein the coordination with the second independently owned and operated storage provider is performed without having received, from the client and prior to the coordination, an authorization specific to the second storage provider to have the content object stored by the second storage provider.

11. The method for coordinating provisions of storage service for clients as recited in claim 9, further comprising receiving automatic feedback from a user node, wherein the change in the metric is based on the feedback, wherein the user node previously requested a same or different content object, and wherein the request was routed to the first or second independently owned and operated storage provider.

12. The method for coordinating provisions of storage service for clients as recited in claim 9, further comprising: presenting a set of service factors to the client; and receiving evaluations of the service factors from the client, wherein each of the selection of the first independently owned and operated storage provider and the selection of the second independently owned and operated storage provider is further based on the evaluations of the service factors.

13. The method for coordinating provisions of storage service for clients as recited in claim 9, wherein the generated score further depends on preferences of the client.

14. The method for coordinating provisions of storage service for clients as recited in claim 9, further comprising: receiving a first request from a user node for the content object; determining that the second independently owned and operated storage provider is storing the content object; generates a second request for the content object; and transmits the second request to the second independently owned and operated storage provider.

15. The method for coordinating provisions of storage service for clients as recited in claim 14, wherein the first request includes a first identifier of the content object and the second request includes a second identifier of the content object.

16. The method for coordinating provisions of storage service for clients as recited in claim 15, wherein each of the first identifier and the second identifier are uniform resource identifiers.

17. A method for coordinating provisions of storage service for clients, the method comprising:

storing, for each independently owned and operated storage provider of a set of independently owned and operated storage providers, a metric characterizing a property of a service provided by the storage provider, wherein the metrics are updated in response to a change in the metrics;

selecting an independently owned and operated storage provider from the set of independently owned and operated storage providers to store a content object of a client, and determining a numerical value for each independently owned and operated storage providers based on the updated metric;

comparing the numerical value across independently owned and operated storage providers and the selection being based on the updated metrics and the numerical value for the set of independently operated storage providers;

coordinating with the independently owned and operated storage provider such that the independently owned and operated storage provider stores the content object of the client;

periodically reanalyzing the updated metrics to determine whether another independently owned and operated storage provider from the set of independently owned and operated storage providers is to store the content object of the client; and upon determining that the another independently owned and operated storage provider from the set of independently owned and operated storage providers is to store the content object of the client, coordinating with the another independently owned and operated storage provider such that the another independently owned and operated storage provider stores the content object.

* * * * *